(12) United States Patent
Schoenberger (10) Patent No.: US 10,285,217 B2
(45) Date of Patent: May 7, 2019

(54) APPARATUS AND METHOD FOR HEATING PREFORMS WITH CHANGED PITCH ON PREFORM DELIVERY

(71) Applicant: KRONES AG, Neutraubling (DE)

(72) Inventor: Wolfgang Schoenberger, Brennberg (DE)

(73) Assignee: KRONES AG, Neutraubling (DE)

( * ) Notice: Subject to any disclaimer, the term of this patent is extended or adjusted under 35 U.S.C. 154(b) by 795 days.

(21) Appl. No.: 14/458,491

(22) Filed: Aug. 13, 2014

(65) Prior Publication Data

US 2015/0048074 A1    Feb. 19, 2015

(30) Foreign Application Priority Data

Aug. 13, 2013 (DE) .................. 10 2013 108 763

(51) Int. Cl.
*B29C 49/42* (2006.01)
*B29C 49/46* (2006.01)
(Continued)

(52) U.S. Cl.
CPC ......... *H05B 1/023* (2013.01); *B29C 49/4205* (2013.01); *B29C 49/4215* (2013.01)

(58) Field of Classification Search
CPC . B29C 49/06; B29C 2035/0822; B29C 49/68; H05B 3/0057
(Continued)

(56) References Cited

U.S. PATENT DOCUMENTS 4,035,463 A * 7/1977 Rosenkranz ............ B29C 49/36
264/296
4,214,860 A * 7/1980 Kleimenhagen ........ B29C 49/12
425/149
(Continued)

FOREIGN PATENT DOCUMENTS

CN   1129422    8/1996
DE   69406298   3/1998
(Continued)

OTHER PUBLICATIONS

China Office Action dated Apr. 6, 2016, issued in corresponding China Patent Application No. 201410395985.2.
(Continued)

*Primary Examiner* — Dana Ross
*Assistant Examiner* — Lawrence H Samuels
(74) *Attorney, Agent, or Firm* — Onello & Mello, LLP (57) ABSTRACT

An apparatus for heating plastic preforms comprises a transport device, which transports the plastic preforms along a predefined transport path. The transport device comprises a first circulating transport device and a second transport device; a plurality of first holding elements constructed and arranged on the first transport device for holding the plastic preforms; at least one heating device along the transport path that heats the plastic preforms during a movement of the plastic preforms along the transport path, wherein the transport path has at least one first portion with a first curvature and at least one second portion with a second curvature which differs from the first curvature; and a plurality of second holding elements constructed and arranged on the second transport device for holding the plastic preforms.

14 Claims, 3 Drawing Sheets

(51) Int. Cl.
*B29C 49/64* (2006.01)
*B29C 31/00* (2006.01)
*H05B 1/02* (2006.01)

(58) Field of Classification Search
USPC ............... 219/778, 780, 775; 425/174.4, 526
See application file for complete search history.

(56) References Cited

U.S. PATENT DOCUMENTS

| | | | | |
|---|---|---|---|---|
| 4,313,720 A * | 2/1982 | Spurr | .................. | B29C 49/4205 264/535 |
| 4,850,850 A * | 7/1989 | Takakusaki | ......... | B29C 49/4205 264/904 |
| 5,308,233 A * | 5/1994 | Denis | .................. | B29C 49/4215 264/906 |
| 5,591,462 A * | 1/1997 | Darling | .................. | B29C 49/80 250/223 B |
| 5,683,729 A * | 11/1997 | Valles | .................. | B29C 49/4215 264/535 |
| 5,783,232 A | 7/1998 | Roos et al. | | |
| 6,770,238 B2 * | 8/2004 | Choinski | ............. | B29C 49/4215 264/535 |
| 6,779,651 B1 | 8/2004 | Linglet et al. | | |
| 6,976,836 B2 * | 12/2005 | Suzuki | ................ | B29C 49/4205 264/538 |
| 7,674,424 B2 * | 3/2010 | Baumgarte | ......... | B29C 49/4205 198/803.12 |
| 8,307,977 B2 * | 11/2012 | Nguyen | .................. | B65G 47/71 198/470.1 |
| 9,022,442 B2 * | 5/2015 | Rousseau | ............ | B29C 49/4205 294/106 |
| 2008/0166445 A1 * | 7/2008 | Baumgarte | ......... | B29C 49/4205 425/526 |
| 2009/0273118 A1 * | 11/2009 | Blochmann | ......... | B29C 49/4205 264/277 |
| 2011/0057362 A1 * | 3/2011 | Meinzinger | ......... | B29C 49/4205 264/519 |
| 2011/0132892 A1 * | 6/2011 | Winzinger | ............ | B29B 13/024 219/420 |
| 2011/0133369 A1 * | 6/2011 | Martini | .................. | B29C 49/12 264/523 |
| 2011/0151047 A1 * | 6/2011 | Borgatti | .................. | B29C 49/36 425/526 |
| 2011/0278134 A1 * | 11/2011 | Voth | .................... | B29C 49/4215 198/478.1 |
| 2012/0038090 A1 * | 2/2012 | Voth | ........................ | B29C 49/42 264/535 |
| 2012/0326358 A1 * | 12/2012 | Geltinger | ................ | B29C 49/12 264/532 |
| 2014/0008927 A1 * | 1/2014 | Rousseau | ............ | B29C 49/4205 294/90 |

FOREIGN PATENT DOCUMENTS

| | | | |
|---|---|---|---|
| DE | 19935266 | 2/2001 | |
| EP | 0846544 | 6/1998 | |
| EP | 2561972 A2 | 2/2013 | |
| EP | 2561972 A3 | 4/2013 | |
| FR | 2802191 | 6/2001 | |
| WO | 2006067056 | 9/2006 | |
| WO | WO 2012123566 A1 * | 9/2012 | ......... B29C 49/4205 |

OTHER PUBLICATIONS

German Search Report dated Mar. 28, 2014 issued in corresponding German Patent Application No. 10 2013 108 763.9.

* cited by examiner

APPARATUS AND METHOD FOR HEATING PREFORMS WITH CHANGED PITCH ON PREFORM DELIVERY

CROSS-REFERENCE TO RELATED APPLICATIONS

A claim for priority under 35 U.S.C. § 119 is made to German Patent Application No. 10 2013 108 763.9 filed Aug. 13, 2013, in at the German Intellectual Property Office, the entire contents of which are hereby incorporated by reference.

FIELD

The present inventive concepts relate to an apparatus and a method for heating plastic preforms.

BACKGROUND

In the beverages-producing industry, it is well-known that plastic preforms must first be heated and then, in the heated state, formed or expanded into plastic containers, for example, using a stretch-blow moulding machine. Normally, the plastic preforms are guided onto a plurality of holding elements and transported along heating devices, such as infrared heating devices.

It is also well-known that when the plastic preforms have small diameters, narrow pitches of the transport devices, for example transport chains, are provided. Small, narrow pitchers are preferable with respect to energy terms than larger pitches, since a mutual heating effect of the plastic preforms can occur and minimum heat can escape between the respective plastic preforms. Furthermore, developments towards more energy-efficient methods and techniques are known.

Thereby, the output rate of subsequent machines, for example stretch-blow moulding machines, continues to increase. In conventional systems, the plastic preforms are typically delivered directly from a holding device, such as a heating mandrel, via a clamp of a further transport star, such as a pitch delay star.

SUMMARY

In accordance with an aspect of the present inventive concepts, an apparatus for heating plastic preforms comprises a transport device, which transports the plastic preforms along a predefined transport path, the transport device comprising a first transport device and a second transport device; a plurality of first holding elements constructed and arranged on the first transport device for holding the plastic preforms; at least one heating device along the transport path that heats the plastic preforms during a movement of the plastic preforms along the transport path, wherein the transport path has at least one first portion with a first curvature and at least one second portion with a second curvature which differs from the first curvature; and a plurality of second holding elements constructed and arranged on the second transport device for holding the plastic preforms, wherein the second transport device moves with the first transport device in a predefined portion of the at least one second portion of the transport path, and wherein at least one plastic preform of the plurality of plastic preforms is transferred at the predefined portion from the first holding elements to the second holding elements, or the at least one plastic preform is held by the first holding elements and the second holding elements simultaneously.

In some embodiments, at least one second holding element of the plurality of second holding element is allocated to each first holding element at the predefined portion of the at least one second portion of the transport path.

In some embodiments, each plastic preform includes a mouth, and wherein the first holding elements grip the plastic preforms at the mouths of the plastic preforms.

In some embodiments, the second holding elements grip the plastic preforms in an outer regions of the plastic preforms.

In some embodiments, the outer regions of the plastic preforms include a mouth region, and wherein the second holding elements grip the plastic preforms at the mouth regions.

In some embodiments, for at least part of the time, the first holding elements and the second holding elements simultaneously grip the plastic preforms.

In some embodiments, the second transport means comprises a rotatable carrier.

In some embodiments, a radial distance of the second holding elements to a rotation axis of the rotatable carrier is enlarged.

In some embodiments, the predefined portion of the at least one second portion of the transport path includes a delivery portion at which the at least one plastic preform is delivered from the first holding elements to the second holding elements.

In some embodiments, the delivery portion is followed by a transfer portion at which the at least one plastic preform is transferred to another transport device.

In some embodiments, the second holding elements are arranged on carrier arms, respectively.

In some embodiments, a pitch between two successive second holding elements in the transport direction of the plastic preforms is variable.

An another aspect, a method for heating plastic preforms comprises transporting the plastic preforms by a transport device along a predefined transport path, wherein the transport device has a first transport device and a second transport device; arranging a plurality of first holding elements on the first transport device for holding the plastic preforms; heating the plastic preforms by at least one heating device for at least part of the time during their transport, wherein the transport path has at least one first portion with a first curvature and at least one second portion with a second curvature which differs from the first curvature; and changing a distance between two successive plastic preforms in the transport direction at least once during the transport of the plastic preforms.

In some embodiments, the transport device comprises a plurality of second holding elements for holding the plastic preforms, wherein the second transport device moves with the first transport device in a predefined portion of the at least one second portion of the transport path, and wherein at least one plastic preform of the plurality of plastic preforms is transferred at the predefined portion from the first holding elements to the second holding elements, or the at least one plastic preform is held by the first holding elements and the second holding elements simultaneously.

In some embodiments, the method further comprises allocating at least one second holding element of the plurality of second holding elements to each first holding element at a predefined portion of the at least one second portion of the transport path.

In some embodiments, the distance between the two successive plastic preforms is enlarged at least once during the transport of the plastic preforms.

In some embodiments, the predefined portion of the at least one second portion of the transport path includes a delivery portion at which the at least one plastic preform is delivered from the first holding elements to the second holding elements.

In some embodiments, the delivery portion is followed by a transfer portion at which the at least one plastic preform is transferred to another transport device.

In some embodiments, the second holding elements are arranged on carrier arms, respectively.

In some embodiments, a pitch between two successive second holding elements in the transport direction of the plastic preforms is variable.

BRIEF DESCRIPTION OF THE FIGURES

The above and other objects and features will become apparent from the following description with reference to the following figures, wherein like reference numerals refer to like parts throughout the various figures unless otherwise specified. In the drawings.

DETAILED DESCRIPTION

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

In connection with the developments of conventional machines, the problem arises that on transfer of the plastic preforms into or from the machine respectively, or between individual modules of the machine, delivery becomes more difficult. In particular, with ever narrower transport devices or chain pitches of a conventional heating apparatus, the delivery of the plastic preforms from the heating device to a subsequent apparatus for forming the plastic preforms into plastic containers becomes more difficult, to the point where a reasonable delivery using clamps is no longer possible. In the delivery method provided in the prior art using clamps, an actively switched clamp engages in a mouth groove of the plastic preform, surrounds this proximal a central point of the plastic preform, and thus holds the plastic preform.

For switching and clamping a plastic preform, however, a predetermined minimum gap is required between the plastic preforms, for example, in a transport chain corresponding to a chain pitch. This problem counters an arbitrary reduction of the chain pitch.

Further, higher machine performance constitutes a problem with this conventional method of achieving plastic preform delivery. Normally during transport in the heating device, the plastic preform sits on a holding device, in particular, a heating mandrel. Before the plastic preform can be delivered to the clamp of a blow moulding machine, for example of a pitch delay star, the heating mandrel must be withdrawn from the mouth of the plastic preform beforehand. This normally takes place via a curve control in a control head of the heating device and by accompanying a clamp of the pitch delay star. Since the path which the clamp can follow on a reference circle of the control head is very limited, the heating mandrel must be withdrawn within a correspondingly short time. This is normally achieved in the prior art via a gradient of the curve track. However, this gradient cannot be selected arbitrarily large or steep, and thus, the maximum performance is limited.

Embodiments of the present inventive concepts are therefore based on the object of increasing the output or performance of blow moulding machines or the like, and preferably also improving the energy efficiency of the heating device.

This is achieved according to the invention with the subjects of the independent claims. Advantageous embodiments and refinements are the subject of the subclaims.

An apparatus according to the inventive concepts for heating plastic preforms has a transport device which transports the plastic preforms along a predefined transport path and which has a circulating transport means, on which a plurality of holding elements is arranged for holding the plastic preforms. Furthermore the apparatus comprises at least one heating device which heats the plastic preforms for at least part of the time during their transport. The transport path thereby has a first portion which has a first course or first curvature respectively, as well as a second portion which has a second course or a second curvature respectively which differs from the first curvature.

It is pointed out that a path with a specific curvature can also be a rectilinear path, i.e. a path with a curvature with an infinite curve radius. Thus, the portions of the transport path differ in particular with regard to the radii of curvature of these portions. Preferably the heating device has at least three, in particular four transport portions with different curvatures. Particularly preferably the first transport portion, which is at the inlet to the heating apparatus, is a rectilinear transport portion. The subsequent second transport portion in particular is formed as a deflection, i.e. curved. The second transport portion can in particular be a substantially circular transport path. This is followed by a preferably rectilinear transport path. At the outlet of the heating apparatus there is in particular a further deflection, which preferably contains a substantially circular transport path. Advantageously the plastic preforms are transported by the first transport means in substantially one plane. It would however also be conceivable for the courses in both portions to have finite radii of curvature or for (constantly) changing radii of curvature to be provided.

According to embodiments of the inventive concepts, the transport device has a second transport device on which a plurality of second holding elements is arranged for holding the plastic preforms, wherein the second transport device moves with the first transport device in a predefined portion of the transport path.

It is therefore proposed to facilitate the delivery of the plastic preforms in that the first and second holding elements move together at least in portions or for part of the time respectively, and thus the plastic preforms can be delivered from the first holding elements to the second holding elements. Preferably, the plastic preforms are held for at least part of the time on a curved, in particular, substantially circular or elliptical, transport path, by two holding elements simultaneously which are arranged substantially above each other. Preferably, the holding elements are arranged coaxially with respect to each other. A transport path which has portions with different curvatures can therefore refer toany transport path which is not formed in a circular manner. This can be an oval transport path, a transport path which has two curved and two rectilinear segments, or similar transport path.

The first holding elements can include mandrels or the like which are inserted into the mouths of the plastic containers. The plastic preforms are advantageously guided on these mandrels during a heating process. The mandrels are thereby also constructed and arranged in a rotatable manner so that the plastic preforms can also be rotated about their own (longitudinal) axis during heating.

Advantageously, the second holding elements can include holding clamps or the like which can grip the plastic preforms on a region of their outer surface, for example below their carrier ring.

In another embodiment, the second holding elements are arranged below the first holding elements if the plastic preforms are transported with their mouths upward. Thus, for example, a fan star arranged below the control head of the heating oven, i.e., also below the first transport means, can move in synchrony with the holding elements, i.e., the first holding elements, with the heating mandrel chain. In an embodiment, in an inlet or a tangential point respectively of this control point, the clamping segment or guide segment, or guide pocket respectively can hold the plastic preform on its carrier ring. Also, an engagement or holding respectively at the closure ring groove is conceivable. The second holding element also holds the plastic preform from the inside on a circular track or predefined transport path of a plastic preform reference circle respectively. Holding in place from the inside in this manner means that the holding element is arranged radially inward in relation to the so transport track of the plastic preform, and preferably contacts at least one region of the plastic preform, which circulates radially further inward with respect to a geometric longitudinal axis of the plastic preform. Furthermore, it is also possible that the movement of the plastic preforms is supported radially outward for example by a guide arc, i.e. a format part. Alternatively, it is also possible that the second holding is elements grip a thread of the plastic preforms to hold the plastic preforms.

As soon as the second holding elements lie on the respective plastic preforms, the first holding elements or heating mandrels, respectively, can begin to be withdrawn from the mouth of the plastic preforms. Because the first and second holding elements move with each other in a predefined portion, or the second holding elements move with the first holding elements respectively, the plastic preform is held on one side and in comparison with embodiments according to the prior art, there is a very great deal of time available for removing the first holding elements from the plastic preform or withdraw the heating mandrels from the mouth respectively. In particular, at high machine output rates, this has a very positive effect on the curve/roll/force ratios. Also the typical problem of accompanying swivel arms of a pitch delay star on delivery of the plastic preforms is solved.

Preferably, more time is available for delivery of plastic preforms to another transport star, because the lower clamps or second holding elements respectively can push the plastic preforms radially outward and hence rapidly enlarge the pitch. Additional time is available for the pitch delay star to extend between the plastic preforms because more space is created between the plastic preforms due to the radial displacement.

After the first holding element has been removed from the mouth or the heating mandrel has been withdrawn from the mouth respectively, the plastic preform is again held preferably at a pitch via a pitch star or a pitch between the plastic preforms is enlarged respectively. Thus, the pitch is also enlarged to facilitate delivery to the pitch delay star, but at the same time to keep the pitch within the oven low because of energy efficiency and allow a clean separation of the plastic preform from its holding element or mandrel respectively.

In another embodiment, the second transport device is followed by a transport device which delivers the plastic preforms to a downstream machine, in particular, a forming device for forming plastic preforms into plastic containers, and in particular, a blow moulding machine. The other transport device can for example include a pitch delay star. Preferably, the pitch delay star downstream of the heating device grips the plastic preforms on their outer regions, in particular, in the region of their mouth or carrier ring respectively.

A pitch delay star can be used preferably since the downstream machine, in particular but not exclusively a downstream forming device for forming the plastic preforms into plastic containers, or a stretch-blow moulding machine, requires a different pitch between plastic preforms than the heating device described herein.

Preferably, the first holding elements grip the plastic preforms in a mouth. The first holding elements can thereby lie on an inner wall of the container mouths and hold this in particular via a friction fit. The plastic preforms are then delivered to the second holding elements which can include clamps arranged below the first holding elements, which grip the plastic preforms from the outside.

Preferably, the second holding elements hold the plastic preforms in an outer region, in particular at a mouth region. A mouth region here, as viewed in the longitudinal direction of the plastic preform, can refer to the region which contains a possible thread as well as carrier ring and/or locking ring. Preferably, the mouth region is followed by a base body of the plastic preform to be expanded.

The plastic preform is held at least temporarily both from the outside as well as from the inside, or by both the first and the second holding elements respectively. As soon as the plastic preforms are held only by the second holding elements, they can also be moved (radially) outward. In this extended position, the plastic preforms can be gripped by the pitch delay star described above. More space and therefore more time are available to the pitch delay star to grip the plastic preforms reliably.

In another embodiment, at least in said portion, precisely one second holding element, is allocated to each first holding element. The plastic preform is advantageously delivered by the first holding element to the second holding element. For at least temporarily, the plastic preform is held by both the first holding element and the second holding element. The second holding element is a holding element against which the plastic preform cannot move in the longitudinal direction, i.e., neither in one direction nor in an opposite direction.

Advantageously, the plastic preform is held by both holding elements during its movement along a predefined portion of the transport path. In some embodiments, this portion can be longer than 5 cm. In some embodiments, this portion is longer than 10 cm. In some embodiments, this portion is longer than 20 cm. Preferably, the plastic preform is also held by both holding elements during a predefined time period. This time period is more than 0.5 sec, preferably more than 1 sec, preferably more than 2 sec and particular preferably more than 5 sec.

In another embodiment, the second transport means comprises a rotatable carrier. This rotatable carrier can thereby have the same axis of rotation which coincides with the axis of rotation of a deflection roller, which serves to deflect the first circulating transport medium.

In another embodiment, a radial distance of the second holding elements to a rotation axis of said rotatable carrier can vary. This variability also allows a change of pitch between two successive plastic preforms. Thus, it is possible for example that, as soon as the plastic preforms have been delivered to the second holding elements, they can also be moved outward in the reference circle track. Thus, during their transport with the second holding elements, the plastic preforms remain stationary on a circular track. However, a reference circle radius of a movement is preferably changed and particularly preferably increased during transport of the plastic preforms. This also increases the pitch between the individual plastic preforms at the time at which they are delivered to the further transport device. This enlargement of the pitch or spreading of the pitch respectively has the advantage that, even with the narrowest pitch in the heating tunnel or at the heating apparatus respectively, on delivery to the pitch delay star a greater pitch can be achieved, in particular a pitch independent of said first chain pitch.

Advantageously, the delivery portion is followed by a transfer portion in which the plastic preforms can be delivered to another transport device.

The second holding elements can be arranged on carrier arms and preferably arranged on a rotatable main carrier by the carrier arms. Thus, it is possible for the arms to be extendable and retractable again respectively in a radial direction in relationship to the direction of rotation of the main carrier.

In another embodiment, the carrier arms extend at least also in a radial direction of the main carrier. Furthermore, drive devices are provided which extend the carriers and retract them again in the radial direction respectively. Thus, for example, a guide curve can be provided which performs a movement of extension. Thus, such a guide device can be arranged in a central region of the main carrier, and in a stationary manner. One or more motorized drives can be provided, in particular linear motors, for extending or retracting one or more carrier arms.

In another embodiment, a pitch between two successive second holding elements in the transport direction of the plastic preforms is variable. Preferably, the pitch can vary during a curved transport portion. The pitch can vary by an extension or retraction of the holding elements respectively, since the radius of a circle on which the holding elements are moved is enlarged or reduced. Therefore, the spacing between two holding elements is likewise enlarged or reduced in a peripheral direction of the circular track.

Embodiments of the present inventive concepts are furthermore directed at a method for heating plastic preforms. In accordance with the method, the plastic preforms are transported by a transport device along a predefined transport path. The transport device has a circulating transport means on which a plurality of first holding elements is arranged for holding the plastic preforms. The holding elements each hold plastic preforms and the plastic preforms are heated by at least one heating device for at least part of the time during their transport. The transport path has a first portion which has a first curvature as well as a second portion which has a second curvature. The second curvature differs from the first curvature. This can be a curvature with an infinite radius, i.e., a rectilinear course. In other words, it is also conceivable and even preferable for individual portions of the transport path to have no curvature or to run in a rectilinear manner respectively.

According to embodiments of the inventive concepts, a distance between two successive plastic preforms in the transport direction is changed and in particular enlarged at least once during transport of the plastic preforms. Advantageously, this enlargement of this distance or pitch respectively takes place in particular to achieve a delivery of the plastic preforms to another transport device, for example, a pitch delay star.

In another embodiment, the transport device comprises secondary holding elements for holding the plastic preforms, which move with the first holding elements at least in portions along the transport path of the plastic preforms. Advantageously, at this portion, the plastic preforms are delivered from the first holding elements to the second holding elements. Furthermore, heating devices are provided which heat the plastic preforms in particular during their transport through the apparatus. The heating devices can in particular be infrared heating devices, where applicable. However, other types of heating devices can be used, for example, microwave heating devices.

Figure 1:
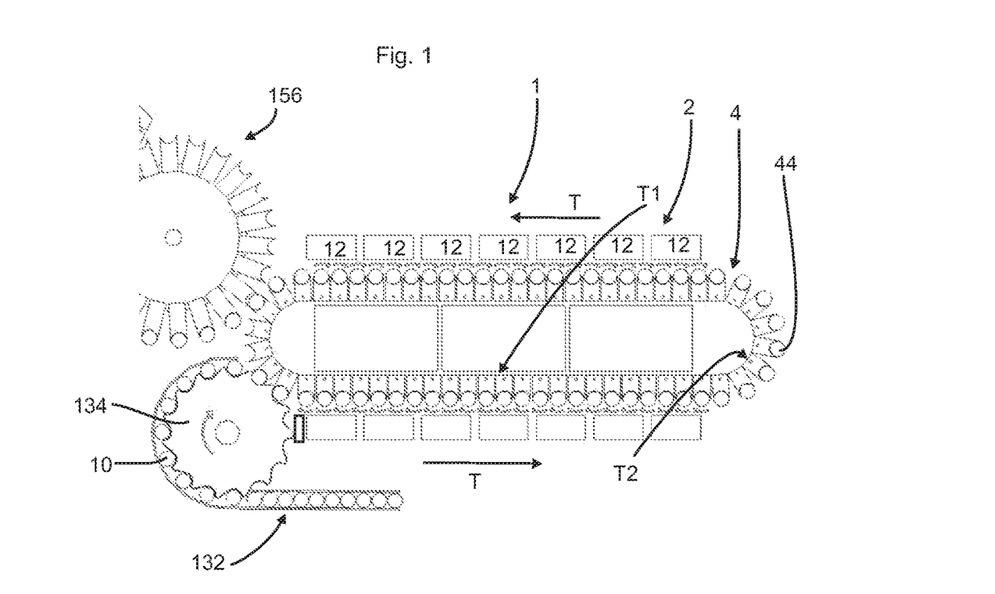
FIG. 1 shows a diagrammatic depiction of an apparatus for treating plastic containers, in accordance with some embodiments.

FIG. 1 shows a diagrammatic depiction of an apparatus 1 for heating plastic preforms 10.

The apparatus 1 has a plurality of heating elements 12. The plastic preforms 10 are guided along a path T along which the heating elements 12 are positioned. During their transport, the plastic preforms 10 are heated in particular by radiation from the heating elements 12, preferably infrared radiation. A transport device 2 comprises a first transport device 4 that transports the plastic preforms 10 along the transport path T. The transport device 4 is constructed and arranged as a circulating chain on which a plurality of holding elements 44 is arranged. The holding elements 44, also referred to as holding mandrels, hold the plastic preforms 10 in their mouth regions, respectively, via a friction fit. Preferably, the plastic preforms 10 can rotate about their longitudinal axes, respectively, during transport on the holding elements 44. A supply device 132 such as a supply rail supplies the plastic preforms to the apparatus 1. A separation device 134 separates the plastic preforms 10 supplied in this way, and guides each plastic preform 10 individually to a holding element 44.

A first portion T1 of the transport path T runs rectilinearly, i.e., it has an infinite radius of curvature. A second portion T2 of the transport path T has a constant finite curvature; i.e., it is formed as a circle segment.

Figure 2:
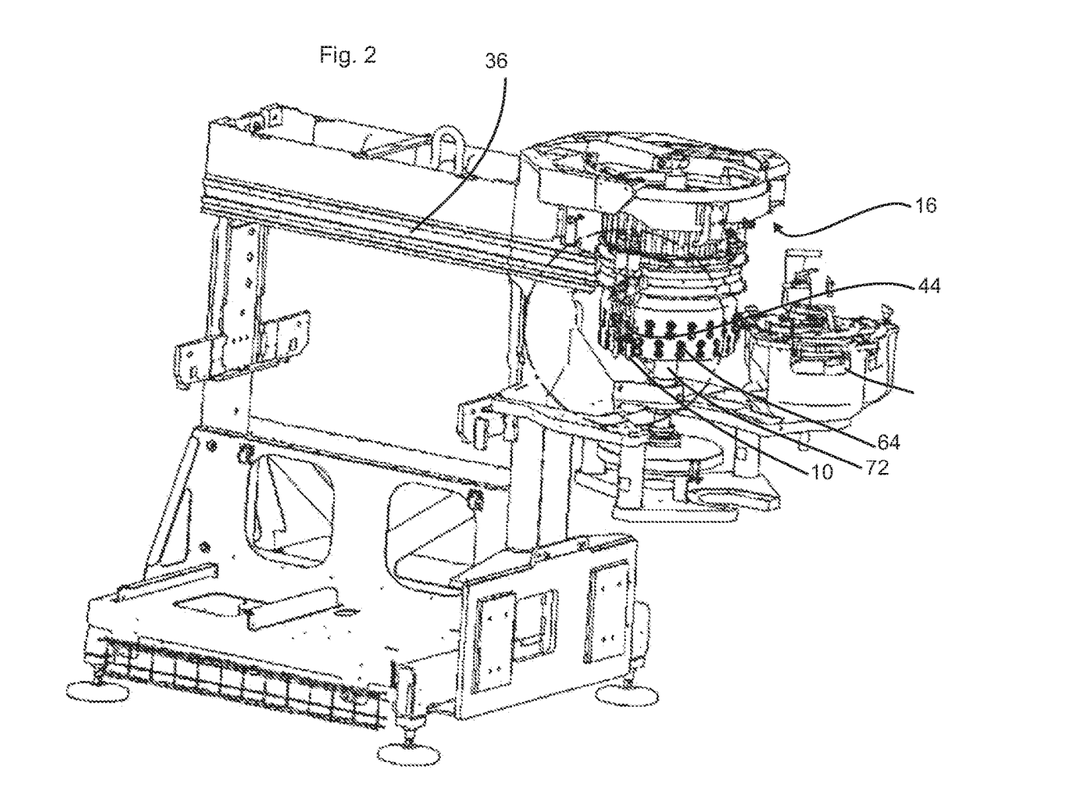
FIG. 2 shows a depiction of a heating apparatus for heating plastic preforms, in accordance with some embodiments.

FIG. 2 shows a depiction of the apparatus shown in FIG. 1. The transport device in the form of a transport chain is not shown in FIG. 2. However, a rear deflection region 16 is shown in which the plastic preforms 10 can be removed again from the apparatus 1. Here, the first holding elements 44, or holding mandrels, are introduced into the mouths of the containers for guiding the containers.

Second holding elements 64 which are arranged on a rotatable carrier. Below the carrier can be seen a drive shaft 72 which drives this carrier.

Figure 3:
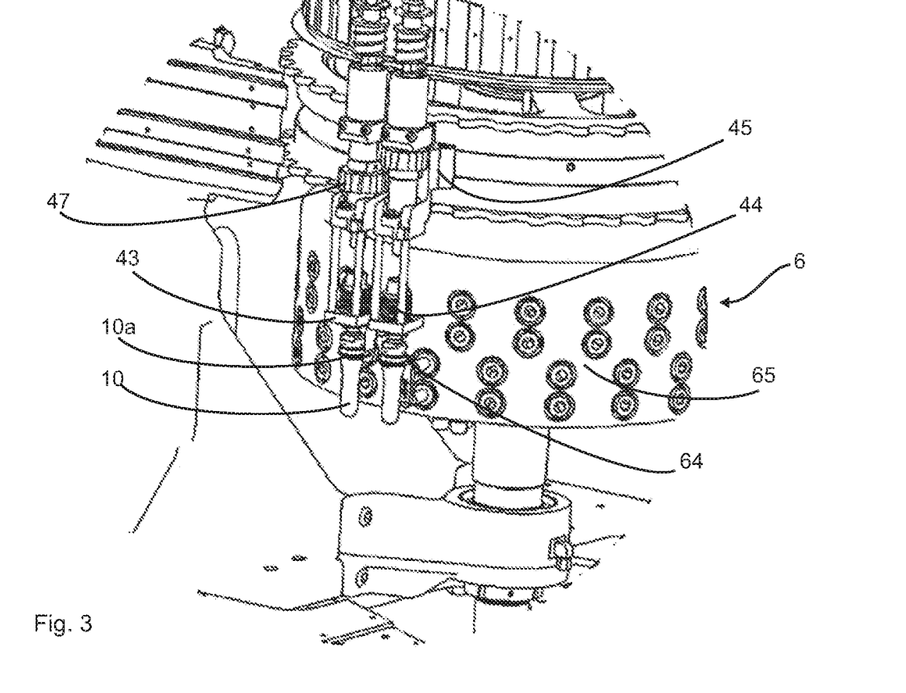
FIG. 3 shows a detailed depiction of the apparatus shown in FIGS. 1 and 2.

FIG. 3 shows a detailed view of the apparatus shown in FIGS. 1 and 2. It is evident here that the first holding elements 44 are mounted rotatably. The rotation can be provoked by a gear wheel 47 during which heating rolls in relation to a gear mechanism (not shown). A holding arm 45 is provided on which the individual holding elements 44 are arranged. A shielding element 43 shields threads of the plastic preforms from excessive heat during the heating process, since the threads must not be heated and/or expanded during the heating process.

A carrier ring 10a is normally present on the preforms, on which for example the second holding element 64 can provide a grip. A second transport device 6 includes a rotatable carrier 65 on which the individual holding elements 64 are arranged.

Figure 4:
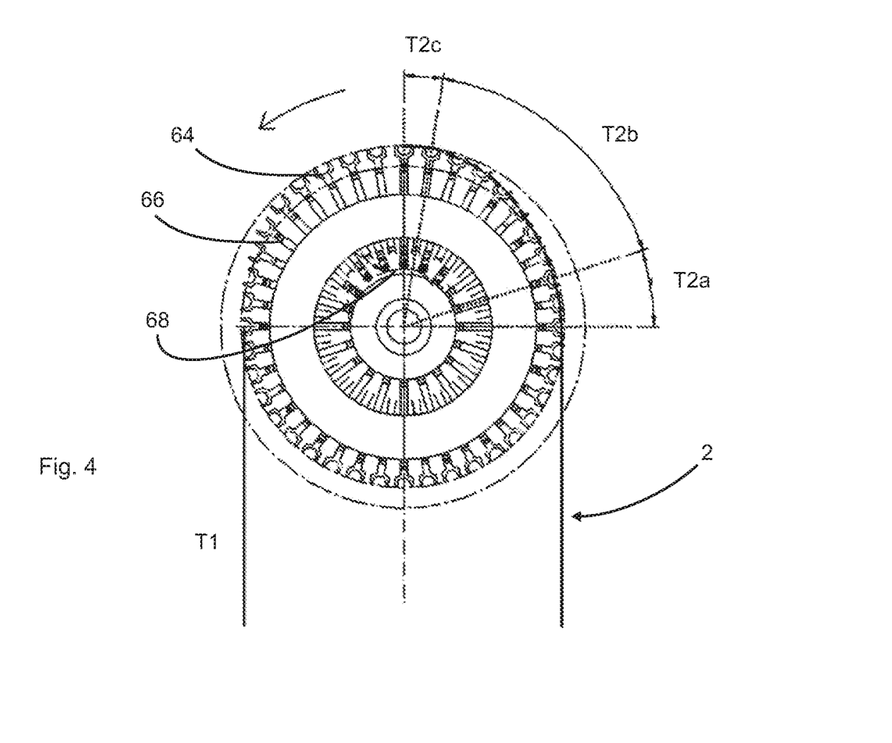
FIG. 4 shows a top view of a delivery region of a plurality of plastic preforms, in accordance with some embodiments.

FIG. 4 shows another view of the apparatus of FIGS. 1-3 according to embodiments of the inventive concepts.

As shown in FIG. 4, the holding elements 64 are arranged on holding arms 66, which can be moved in particular radially outward by a guide curve 68 in order to enlarge the pitch between the individual holding elements 64 and hence also the plastic preforms held thereon. Reference symbols T2a, T2b and T2c designate different portions of the transport path. In portion T2a of the transport path, the second holding elements 64 move with the first holding elements 44 (not shown). In this region, plastic preforms can be transferred from the first holding elements 44 to the second holding elements 64, or here the plastic preforms can be held respectively additionally by the first holding elements 44 and also for part of the time by the second holding elements 64 simultaneously. Then the first holding elements 44, a movement of which is controlled by a curve, are withdrawn from the plastic preforms. In portion T2b, the individual second holding elements 64 are moved radially outward. In this manner on the one hand the reference circle radius on which the plastic preforms move is increased, and on the other hand the distance is increased between the individual holding elements. In region T2c as well as in the subsequent region, the distance between the holding elements is at its largest. Preferably within this region, the clamps of the pitch delay star reach into the gaps between the plastic preforms. In this region, the clamps have sufficient time and place to grip the plastic preform securely. The holding elements of the pitch delay star already grip the plastic preforms in region T2b. A further region T1 of the transport path is provided on which the plastic preforms are transported rectilinearly.

Figure 5:
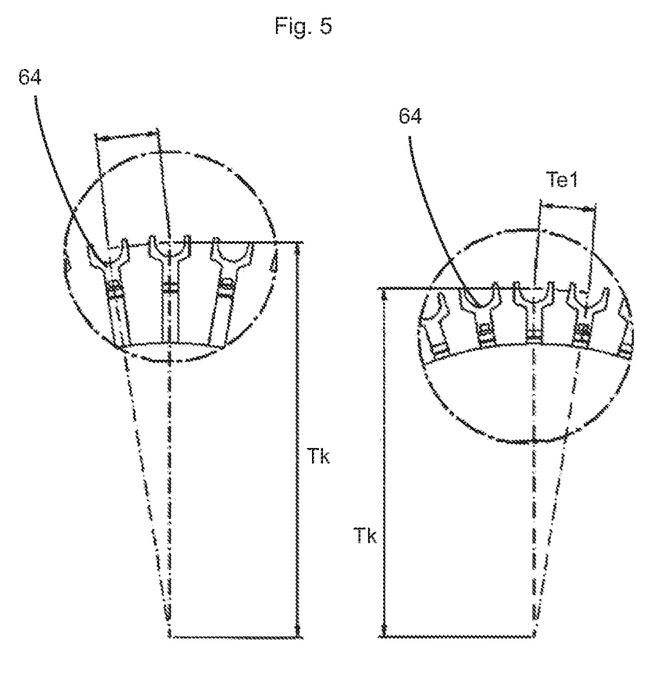
FIG. 5 shows a further depiction to illustrate an enlargement of a pitch between plastic preforms, in accordance with some embodiments.

FIG. 5 shows a further depiction to illustrate the pitch. It is evident that in the view on the left, individual holding arms have been extended telescopically or radially outward respectively. Thus, the distance between two holding elements 64 in the peripheral direction is greater than in the situation shown in the right-hand drawing. A reference circle radius Tk is illustrated on which the individual holding elements 64 move.

The applicant reserves the right to claim all features disclosed in the application documents as being essential to the inventive concepts insofar as they are novel individually or in combination in relation to the prior art.

What is claimed is:

1. An apparatus for heating plastic preforms, comprising:
   a transport device . . . ;

a plurality of first holding elements . . . ;

at least one heating device . . . ; and a plurality of second holding elements . . . , and wherein a radial distance is enlargeable between the second holding elements and a rotation axis of the rotatable carrier.

2. The apparatus of claim 1, wherein at least one second holding element of the plurality of second holding elements is allocated to each first holding element at the predefined portion of the at least one second portion of the transport path.

3. The apparatus of claim 1, wherein each plastic preform includes a mouth, and wherein the first holding elements grip the plastic preforms at the mouths of the plastic preforms.

4. The apparatus of claim 1, wherein the second holding elements grip the plastic preforms in an outer regions of the plastic preforms.

5. The apparatus of claim 4, wherein the outer regions of the plastic preforms include a mouth region, and wherein the second holding elements grip the plastic preforms at the mouth regions.

6. The apparatus of claim 1, wherein for at least part of the time, the first holding elements and the second holding elements simultaneously grip the plastic preforms.

7. The apparatus of claim 1, wherein the predefined portion of the at least one second portion of the transport path includes a delivery portion at which the at least one plastic preform is delivered from the first holding elements to the second holding elements.

8. The apparatus of claim 7, wherein the delivery portion is followed by a transfer portion at which the at least one plastic preform is transferred to another transport device.

9. The apparatus of claim 1, wherein the second holding elements are arranged on carrier arms, respectively.

10. The apparatus of claim 1, wherein a pitch between two successive second holding elements in the transport direction of the plastic preforms is variable.

11. The apparatus of claim 1, wherein at least one plastic preform of the plurality of plastic preforms is transferred at the predefined portion from the first holding elements to the second holding elements, or the at least one plastic preform is held by the first holding elements and the second holding elements simultaneously.

12. Apparatus for heating plastic preforms with a transport device which transports the plastic preforms along a predefined transport path and which has a first circulating transport means, on which a plurality of first holding elements is arranged . . . , wherein the transport device has a second transport means on which a plurality of second holding elements is arranged . . . , wherein the second transport means comprises a rotatable carrier, and wherein a radial distance is enlargeable between the second holding elements and a rotation axis of the rotatable carrier.

13. The apparatus of claim 1, wherein one of the two holding elements is moved by a different rotatable mechanism than the other of the two holding elements.

14. The apparatus of claim 1, wherein at least one of the two holding elements directly contacts the preforms.

* * * * *

UNITED STATES PATENT AND TRADEMARK OFFICE
CERTIFICATE OF CORRECTION

PATENT NO. : 10,285,217 B2
APPLICATION NO. : 14/458491
DATED : May 7, 2019
INVENTOR(S) : Wolfgang Schoenberger It is certified that error appears in the above-identified patent and that said Letters Patent is hereby corrected as shown below:

In the Claims

Claim 1, Column 10, Line 67, please delete "...;" after "a transport device" and replace with --which transports the plastic preforms along a predefined transport path, the transport device comprising a first circulating transport device and a second transport device, wherein the second transport device comprises a rotatable carrier;--

Claim 1, Column 11, Line 1, please delete "...;" after "a plurality of first holding elements" and replace with --constructed and arranged on the first transport device for holding the plastic preforms, wherein the first holding elements includes holding mandrels;--

Claim 1, Column 11, Line 2, please delete "...;" after "at least one heating device" and replace with --along the transport path that heats the plastic preforms during a movement of the plastic preforms along the transport path, wherein the transport path has at least one first portion with a first curvature and at least one second portion with a second curvature which differs from the first curvature;--

Claim 1, Column 11, Line 3, please delete "...," after "a plurality of second holding elements" and replace with --constructed and arranged on the second transport device for holding the plastic preforms, wherein the second transport device moves with the first transport device in a predefined portion of the at least one second portion of the transport path, wherein the preforms are transported along a bent transport path at least at the same time by two holding elements of the plurality of first and second holding elements arranged above one another,--

Claim 12, Column 12, Line 19, please delete "...," after "on which a plurality of first holding elements is arranged" and replace with --for holding the plastic preforms, wherein the first holding elements includes holding mandrels, with at least one heating device which heats the plastic preforms for at least part of the time during their transport, wherein the transport path has at least one first portion with a first curvature and at least one second portion with a second curvature which differs from the first curvature,--

Signed and Sealed this
Twenty-fifth Day of February, 2020

Andrei Iancu
*Director of the United States Patent and Trademark Office*

Claim 12, Column 12, Line 21, please delete "...," after "a plurality of second holding elements" and replace with --for holding the plastic preforms,--